US008699832B2

(12) United States Patent
Matsuura et al.

(10) Patent No.: US 8,699,832 B2
(45) Date of Patent: Apr. 15, 2014

(54) OPTICAL SWITCH

(75) Inventors: Nobuaki Matsuura, Kanagawa (JP); Koichi Hadama, Kanagawa (JP); Etsu Hashimoto, Kanagawa (JP); Yuzo Ishii, Kanagawa (JP); Mitsuo Usui, Kanagawa (JP); Tohru Matsuura, Kanagawa (JP); Toshiki Nishizawa, Kanagawa (JP); Yuji Mitsuhashi, Kanagawa (JP)

(73) Assignees: Nippon Telegraph and Telephone Corporation, Tokyo (JP); NTT Electronics Corporation, Yokohama-Shi, Kanagawa (JP)

( * ) Notice: Subject to any disclaimer, the term of this patent is extended or adjusted under 35 U.S.C. 154(b) by 148 days.

(21) Appl. No.: 13/260,554

(22) PCT Filed: Mar. 29, 2010

(86) PCT No.: PCT/JP2010/055532
§ 371 (c)(1),
(2), (4) Date: Sep. 26, 2011

(87) PCT Pub. No.: WO2010/110474
PCT Pub. Date: Sep. 30, 2010

(65) Prior Publication Data
US 2012/0093458 A1 Apr. 19, 2012

(30) Foreign Application Priority Data

Mar. 27, 2009 (JP) ................................. 2009-078997

(51) Int. Cl.
*G02B 6/35* (2006.01)

(52) U.S. Cl.
USPC .................................. 385/19; 385/18; 385/24

(58) Field of Classification Search
USPC ............................................................ 385/19
See application file for complete search history.

(56) References Cited

U.S. PATENT DOCUMENTS

| 6,097,859 A * | 8/2000 | Solgaard et al. ................. 385/17 |
| 7,315,670 B2 * | 1/2008 | Kobayashi et al. ............. 385/17 |
| 2005/0025411 A1 * | 2/2005 | Nakano et al. ................... 385/16 |

FOREIGN PATENT DOCUMENTS

| JP | 2003-101479 A | 4/2003 |
| JP | 2005-062831 A | 3/2005 |
| JP | 2006-106304 A | 4/2006 |
| JP | 2008-224824 A | 9/2008 |
| JP | 2009-025755 A | 2/2009 |
| JP | 2009-128578 A | 6/2009 |
| JP | 2009-134294 A | 6/2009 |

OTHER PUBLICATIONS

Hadama et al., "Low—dynamic—crosstalk Wavelength—selective Switch with MEMS Mirro Array", the 2009 IEICE Electronics Society Conference,C-3-81, p. 236.

* cited by examiner

*Primary Examiner* — Jerry Rahll
(74) *Attorney, Agent, or Firm* — Blakely Sokoloff Taylor & Zafman

(57) ABSTRACT

A light-shielding portion (10) shields the light spot of output light output toward a shunt position α by a projecting portion (12). Hence, the output light output toward the shunt position α does not travel to an output port (111). This allows to prevent crosstalk.

6 Claims, 10 Drawing Sheets

OPTICAL SWITCH

This is a non-provisional application claiming the benefit of International Application Number PCT/JP2010/055532 filed Mar. 29, 2010.

TECHNICAL FIELD

The present invention relates to an optical switch for multiplexing/demultiplexing wavelength division multiplex signals or selecting a path.

BACKGROUND ART

To implement a flexibly reconstructible network in the field of wavelength division multiplex communication, a wavelength-selective optical switch capable of inserting or branching an optical signal having an arbitrary wavelength into an arbitrary path is essential. The optical switch often uses a mirror device created by the MEMS (Micro Electro Mechanical Systems) technology as a means for deflecting light. This mirror device can be provided with a plurality of pivotal axes to make the mirror pivot. Hence, for example, in addition to a first pivotal axis that implements optical path switching, a second pivotal axis perpendicular to the first pivotal axis is provided. The mirror pivots about the second pivotal axis, thereby changing the optical loss. This allows to implement optical signal power control as well as optical path switching.

Such an optical switch can have two forms depending on its function: ADD type and DROP type. An ADD-type optical switch multiplexes optical signals with different wavelengths input from a plurality of input ports and outputs the multiplexed signal from at least one output port. On the other hand, a DROP-type optical switch demultiplexes a wavelength-multiplexed optical signal input from at least one input, port for each wavelength, and outputs the signals of the respective wavelengths from different output ports. These optical switch structures will be explained with reference to FIGS. 9 to 11.

An optical switch 100 shown in FIGS. 9 to 11 includes an input/output port array 110 having input and output ports (to be collectively referred to as "input/output ports" hereinafter) arrayed in a predetermined direction, a condenser optical system 120 formed from a first lens 121, a cylindrical lens 122, and a second lens 123, a diffraction grating 130, a third lens 140, and a mirror array 150 having a plurality of MEMS mirror devices 151 arrayed in a line along a predetermined direction. These components are arrayed in a line along the z-axis in the order named. The mirror of each MEMS mirror device 151 can pivot about the x-axis perpendicular to the z-axis and about the y-axis perpendicular to the x-axis. The input/output ports are arrayed in the direction along the y-axis. The MEMS mirror devices 151 are arrayed in the direction along the x-axis.

When the optical switch 100 is of the ADD type, the input/output port array 110 includes a plurality of input ports and one output port. In the ADD-type optical switch, signal light to be referred to as input light hereinafter) components input from the plurality of input ports are condensed on the diffraction grating 130 via the condenser optical system 120 and demultiplexed for each wavelength by the diffraction grating 130. Each of the demultiplexed signal light components of the respective wavelengths is condensed by the third lens 140 and enters a corresponding one of the MEMS mirror devices 151 of the mirror array 150. The signal light (to be referred to as output light hereinafter) components deflected by the MEMS mirror devices 151 are condensed by the third lens 140 and multiplexed by the diffraction grating 130. The thus wavelength-multiplexed output light is output from one output port via the condenser optical system 120.

On the other hand, when the optical switch 100 is of the DROP type, the input/output port array 110 includes one input port and a plurality of output ports. In the DROP-type optical switch, input light input from one input port is condensed on the diffraction grating 130 via the condenser optical system 120 and demultiplexed into the respective wavelengths by the diffraction grating 130. Each of the demultiplexed signal light components having the respective wavelengths is condensed by the third lens 140 and enters a corresponding one of the MEMS mirror devices 151 of the mirror array 150. Each of the output light components of the respective wavelengths deflected by the MEMS mirror devices 151 is output from a corresponding one of the output ports via the third lens 140, the diffraction grating 130, and the condenser optical system 120.

In the optical switch 100 having the above-described structure, making the mirror of each MEMS mirror device 151 of the mirror array 150 pivot about the x-axis indicates selecting an input port or an output port because the output light traveling direction changes to the array direction (y-direction) of the input/output port array 110. That is, an input port is selected in the ADD-type optical switch, and an output port is selected in the DROP-type optical switch. On the other hand, making the mirror of each MEMS mirror device 151 pivot about the y-axis indicates controlling the coupling ratio from the input port to the output port, that is, the light attenuation amount because the output light traveling direction changes to the direction (x-direction) perpendicular to the array direction of the input/output port array 110. The pivotal movement about the x-axis and that about the y-axis are combined. This allows the optical switch 100 to, upon input/output port switching, move the output light to make a detour around input/output ports other than the input output port of interest or give a predetermined light attenuation amount to optical coupling of the input/output port of interest.

RELATED ART LITERATURE

Patent Literature

Patent Literature 1: Japanese Patent Laid-Open No. 2003-101479

DISCLOSURE OF INVENTION

Problem to be Solved by the Invention

In the above-described optical switch, however, when moving output light to make a detour around the input/output ports other than the input/output port of interest for input/output port switching, the output light may partially couple with the input/output ports other than the input/output port of interest, resulting in crosstalk.

For example, in the ADD-type optical switch, output light components based on input ports other than a predetermined input port couple with the output port. This phenomenon will be described with reference to FIG. 12.

FIG. 12 illustrates an output port 111 and input ports 112 to 114, which are projected to the position of the second lens 123 in the ADD-type optical switch. The positive y-direction is defined as upward, and the negative y-direction as downward. The input port 112 is disposed at the uppermost portion, and the input port 113 is disposed at the lowermost portion. The input port 114 is disposed immediately below the input port 112.

Output light to be output from the output port 111 is switched from light based on the input port 112 to that based on the input port 113. In this case, the mirror of each MEMS mirror device 151 pivots about the y-axis first. Then, the light spot of output light based on input light from the input port 112 moves to a it position (to be referred to as a shunt position hereinafter) α adjacent to the output port 111 in the x-direction, as indicated by a in FIG. 12. Next, the mirror of each MEMS mirror device 151 pivots about the x-axis. Then, the light spot of output light projected to the shunt position α sequentially moves from that based on the input port 112 and reaches that based on the input port 113. When the light spot of output light projected to the shunt position α has changed to that based on the input port 113, the mirror of each MEMS mirror device 151 pivots about the y-axis to couple the light spot with the output port 111, as indicated by b.

The light spot of input light or output light has an elliptical shape. For this reason, even if the light spot moves to the shunt position to switch the input port, the region of the output light that enters the output port 111 interferes with the light spot at the shunt position α. When the mirror of each MEMS mirror device 151 pivots about the x-axis to switch the input port, output light based on the input port 114 halfway may enter the output port 111, resulting in crosstalk.

On the other hand, in the DROP-type optical switch, output light couples with output ports other than a predetermined output port. This phenomenon will be described with reference to FIG. 13.

FIG. 13 illustrates an input port 115 and output port 116 to 118, which are projected to the position of the second lens 123 in the DROP-type optical switch. The positive y-direction is defined as upward, and the negative y-direction as downward. The output port 116 is disposed at the uppermost portion, and the output port 117 is disposed at the lowermost portion. The output port 118 is disposed immediately below the output port 116.

When switching the output port for output light having a predetermined wavelength from the output port 116 to the output port 117, the mirror of the MEMS mirror device 151 corresponding to the output light with the predetermined wavelength pivots sequentially about the y-axis, the x-axis, and the y-axis. Then, a light spot β of the output light with the predetermined wavelength moves from the output port 116 to the output port 117, as indicated by c.

The light spot of the output light has an elliptical shape, as described above. For this reason, when the light spot of the output light is moved to switch the output port, the region corresponding to each output port adjacent to the moving path may interfere with the light spot of the output light, resulting in crosstalk.

The present invention has been made to solve the above-described problem, and has as its object to provide an optical switch capable of reducing crosstalk upon switching an input/output port.

Means of Solution to the Problem

In order to solve the above-described problem, an optical switch according to the present invention comprises an input/output unit in which at least one input port and at least one output port are arrayed along a first direction, a demultiplexing unit that demultiplexes input light input from the input port for each wavelength, a deflecting unit that deflects the input light demultiplexed by the demultiplexing unit and outputs the light from a predetermined output port as output light, and a light-shielding portion that, when outputting predetermined output light from the predetermined output port, shields output light other than the predetermined output light so as to prevent the output light from being output from the predetermined output port.

Effect of the Invention

According to the present invention, the light-shielding portion is provided. Hence, when outputting predetermined output light from a predetermined output port, output light at than the predetermined output light can be prevented from being output from the predetermined output port. This allows to reduce crosstalk upon switching the input/output port.

BEST MODE FOR CARRYING OUT THE INVENTION

First Embodiment

Figure 9:
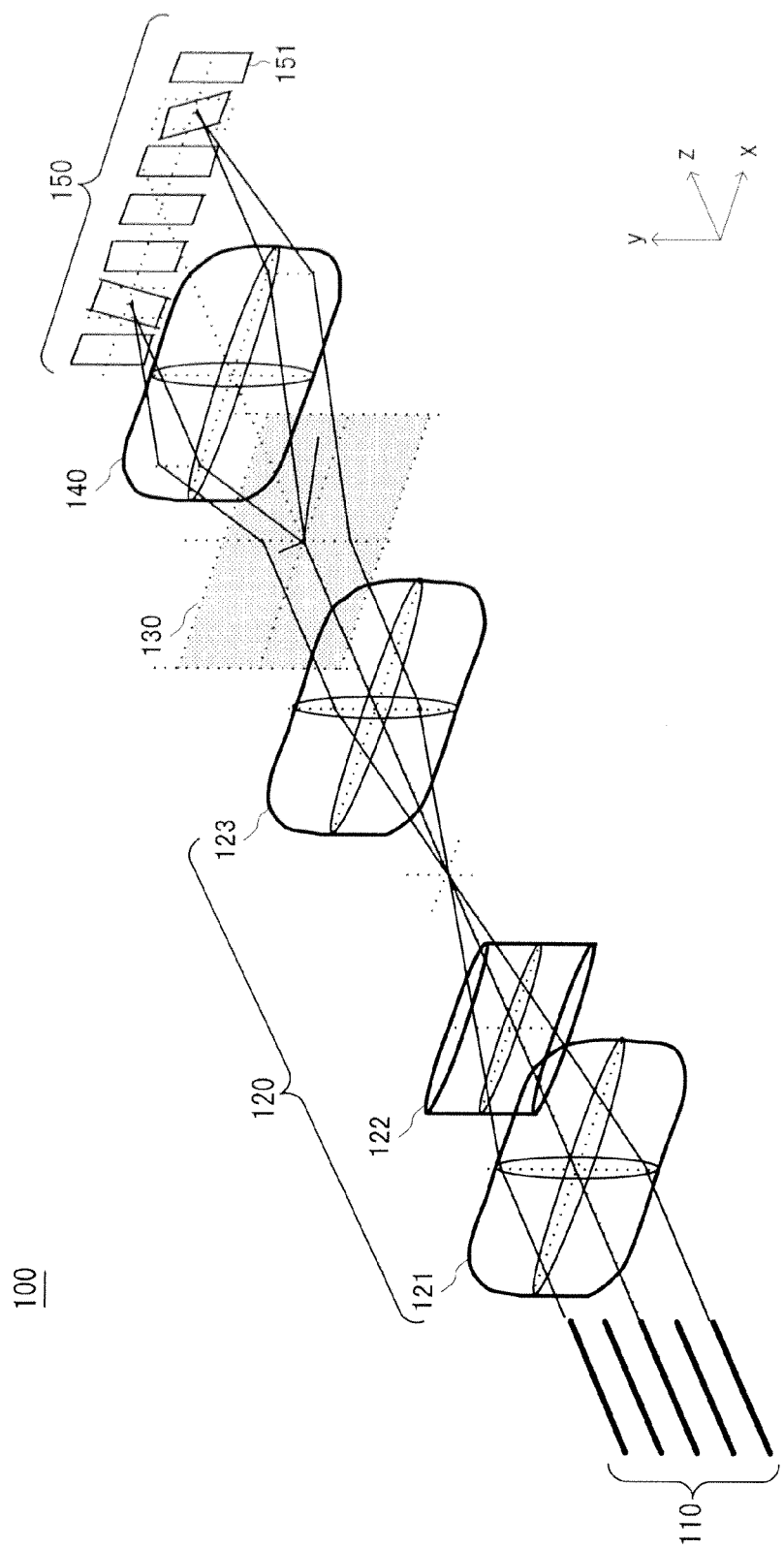
FIG. 9 is a perspective view schematically showing the arrangement of a conventional optical switch.
Figure 10:
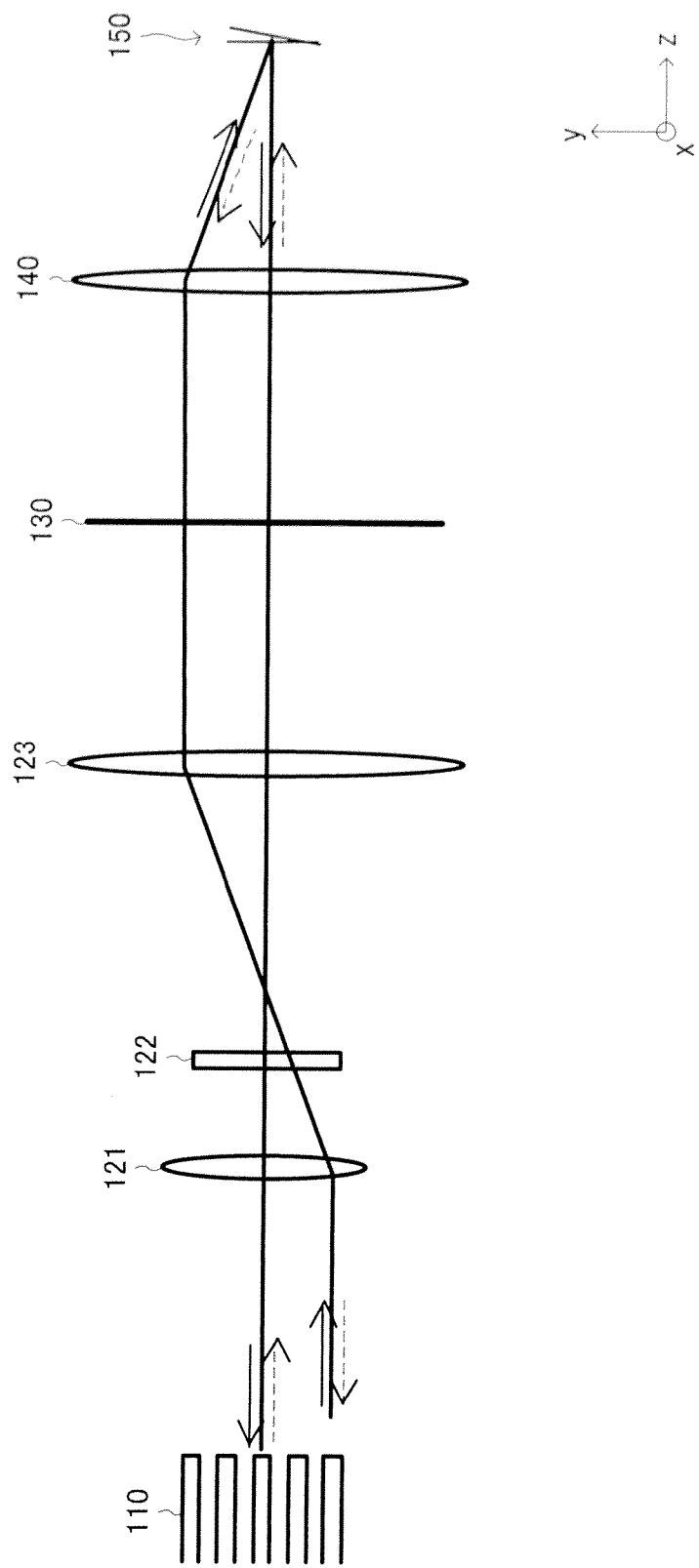
FIG. 10 is a front view of FIG. 9.
Figure 11:
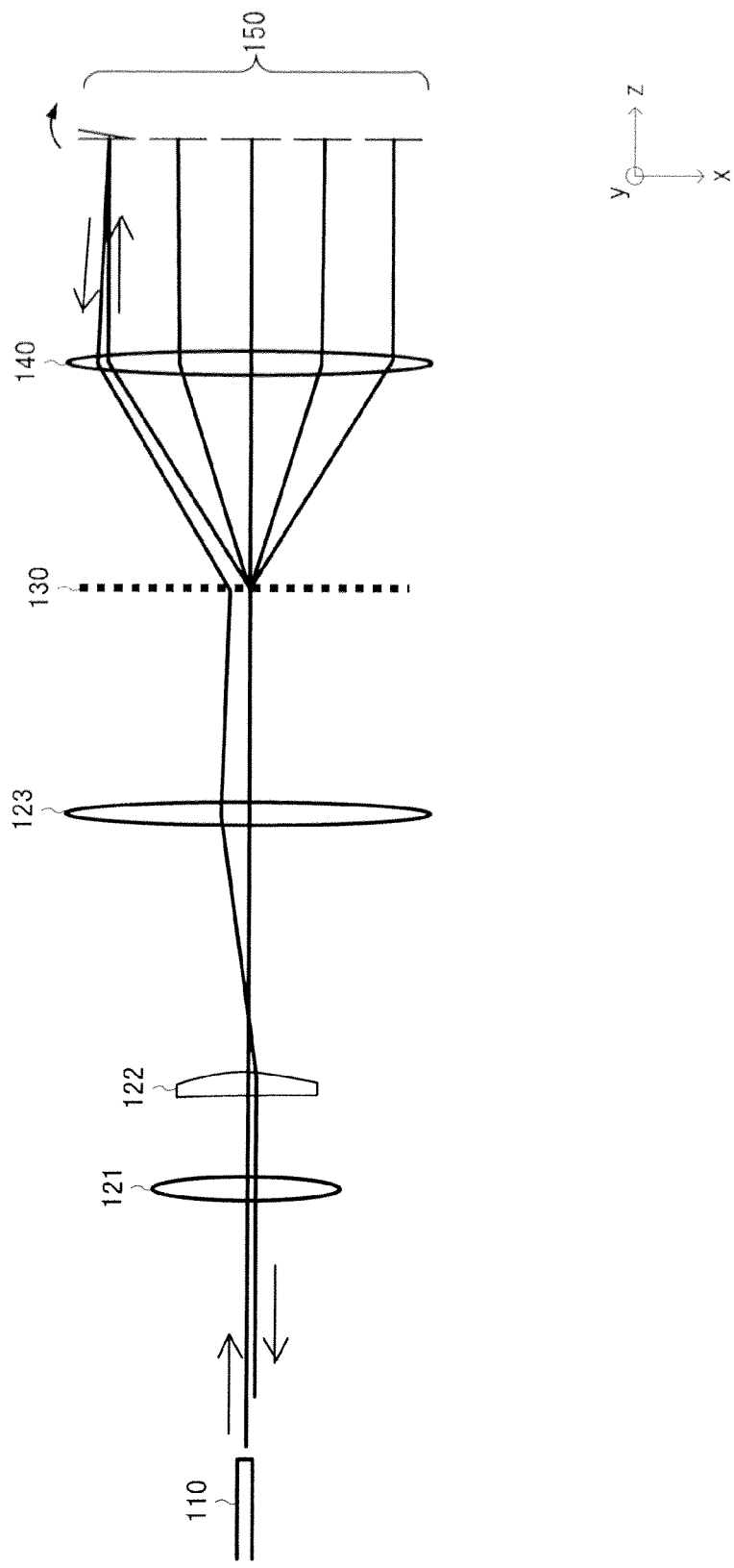
FIG. 11 is a plan view of FIG. 9.
Figure 12:
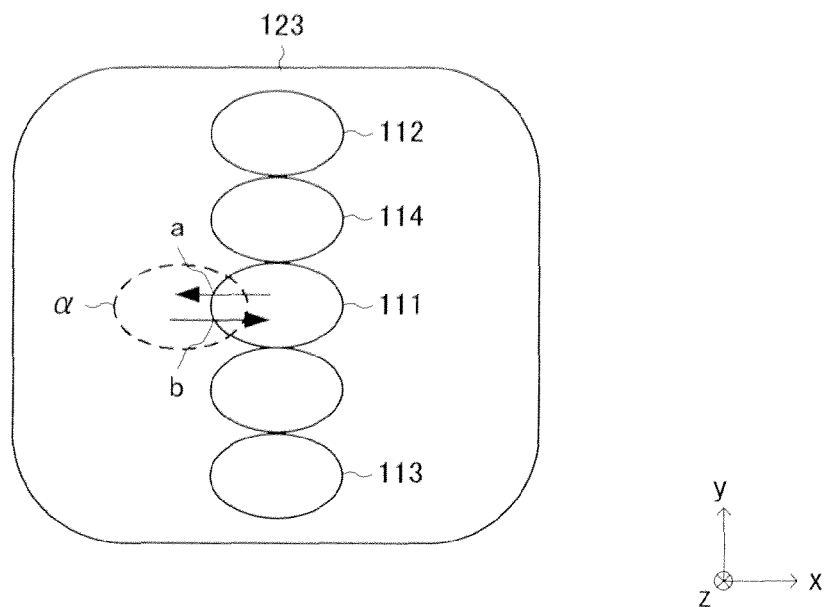
FIG. 12 is a view for explaining the input/output port switching operation of the conventional optical switch.
Figure 13:
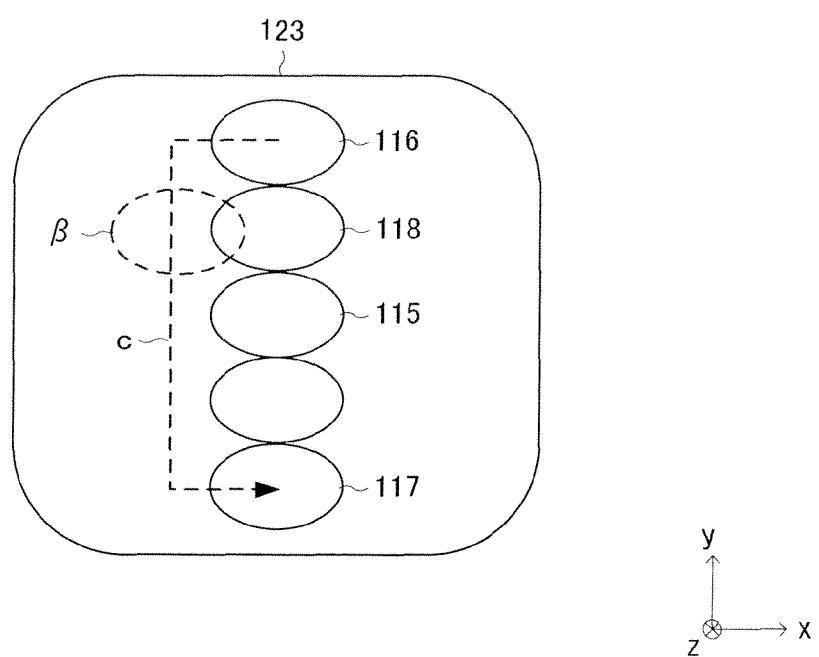
FIG. 13 is a view for explaining the input/output port switching operation of the conventional optical switch.

The first embodiment of the present invention will be described first. Note that an optical switch according to this embodiment is formed by adding a light-shielding portion to the optical switch 100 described with reference to FIGS. 9 to 11. Hence, in the following explanation, the same names and reference numerals are added to the same constituent elements as those of the optical switch 100, and a description thereof will appropriately be omitted.

Figure 1:
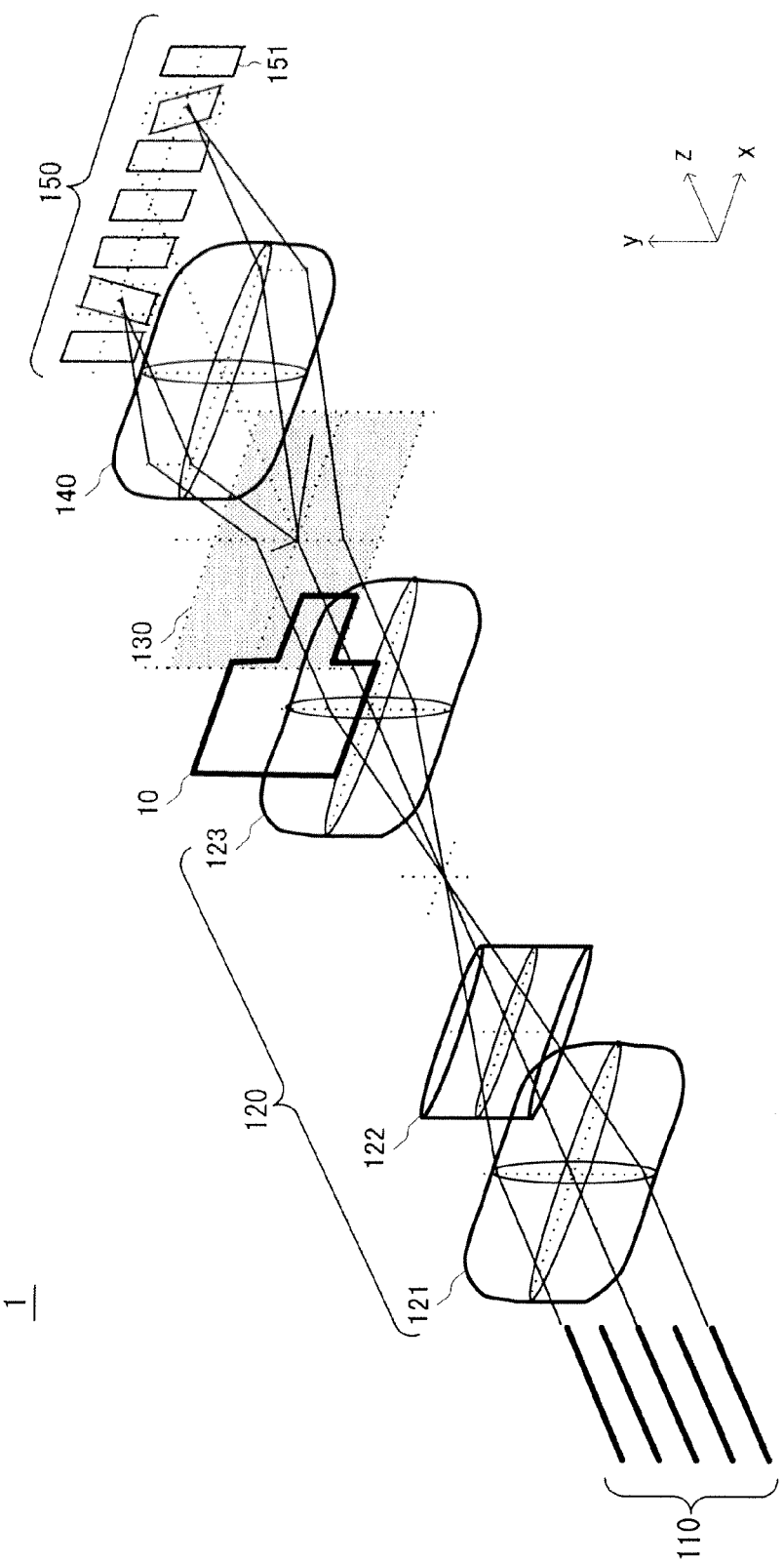
FIG. 1 is a perspective view schematically showing the arrangement of an optical switch according to the first embodiment of the present invention.

As shown in FIG. 1, an optical switch 1 according to this embodiment is an ADD-type wavelength-selective optical switch, and includes an input/output port array 110 having input and output ports arrayed in a predetermined direction, a condenser optical system 120 formed from a first lens 121, a cylindrical lens 122, and a second lens 123, a light-shielding portion 10, a diffraction grating 130, a third lens 140, and a mirror array 150 having a plurality of MEMS mirror devices 151 arrayed in a line along a predetermined direction. These components are arrayed in a line along the z-axis in the order named. The mirror of each MEMS mirror device 151 can pivot about the x-axis perpendicular to the z-axis and about the y-axis perpendicular to the x-axis. The input/output ports are arrayed in the direction along the y-axis. The MEMS mirror devices 151 are arrayed in the direction along the x-axis.

Figure 2:
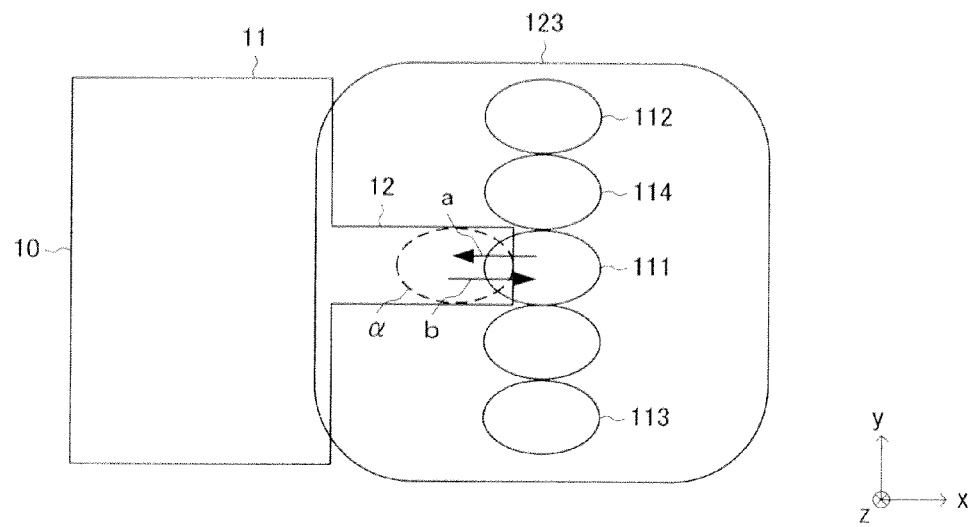
FIG. 2 is a front view schematically showing the arrangement of a light-shielding portion.

The light-shielding portion 10 is formed from a light-shielding mask such as a plate member that passes no light. The light-shielding portion 10 includes a base portion 11 having an almost rectangular shape when viewed from the upper side, and a projecting portion 12 projecting from the center of one side of the base portion 11 along the y-axis direction. The projecting portion 12 is formed into an almost rectangular shape when viewed from the upper side so that the length in the y-axis direction is equal to or larger than the length of output light in the y-axis direction, and the length in the x-axis direction is equal to or larger than the length of output light in the x-axis direction. As for the light-shielding portion 10, the base portion 11 is disposed adjacent to the second lens 123 on the negative side of the x-axis such that the projecting portion 12 projects toward the center of the second lens 123 when the second lens 123 is viewed from the negative side of the z-axis, as shown in FIG. 2. The projecting portion 12 thus overlaps a shunt region α. The end portion of the projecting portion 12 interferes with part of the region of output light entering an output port 111 on the negative side in the x-axis direction. In addition, the light-shielding portion 10 is disposed at a position between the second lens 123 and the diffraction grating 130, where each light spot is not demultiplexed and spreads to an appropriate size. This allows to effectively shield a desired light spot.

The operation of the optical switch 1 according to this embodiment will be described next. Note that in this embodiment, an example will be explained in which one output port and four input ports are provided. The positive y-direction is defined as upward, and the negative y-direction as downward. An input port 112 is disposed at the uppermost portion, and an input port 113 is disposed at the lowermost portion. An input port 114 is disposed immediately below the input port 112. The output port 111 is disposed at the center.

Input light components input from the plurality of input ports are condensed by the condenser optical system 120 and travel toward the diffraction grating 130. As shown in FIG. 2, the projecting portion 12 of the light-shielding portion 10 is provided at a position adjacent to the output port 111 in the x-axis direction and does not interfere with the region where the input light passes. Hence, the input light reaches the diffraction grating 130 without being shielded by the light-shielding portion 10.

The input light that has reached the diffraction grating 130 is demultiplexed by it. Each of the demultiplexed input light components is condensed by the third lens 140 and enters a corresponding one of the MEMS mirror devices 151 of the mirror array 150. Output light components deflected by the MEMS mirror devices 151 are condensed by the third lens 140 and multiplexed by the diffraction grating 130. The thus wavelength-multiplexed output light travels toward the condenser optical system 120. At this time, the end portion of the projecting portion 12 of the light-shielding portion 10 interferes with part of the end portion of the output light entering the output port 111 on the negative side in the x-axis direction, as shown in FIG. 2. The light intensity of the output light is thus attenuated in accordance with the amount of interference with the projecting portion 12.

The output light whose light intensity is adjusted by the light-shielding portion 10 is output from the output port 111 via the condenser optical system 120.

The operation of the optical switch 1 according to this embodiment when switching the output light to be output from the output port 111 will be described next with reference to FIG. 2. Note that an example will be explained below in which the output light to be output from the output port 111 is switched from that based on the input port 112 to that based on the input port 113.

First, the mirror of each MEMS mirror device 151 pivots about the y-axis. Then, the light spot of output light based on input light from the input port 112 moves to the shunt position α adjacent to the output port 111 in the x-direction, as indicated by a in FIG. 2. The shunt position α interferes with the projecting portion 12 of the light-shielding portion 10. Hence, the light spot moved to the shunt position α is shielded by the projecting portion 12 and does not travel to the input/output port side from the light-shielding portion 10.

After the light spot of the output light has moved to the shunt position α, the mirror of each MEMS mirror device 151 pivots about the x-axis. Then, the light spot of the output light output toward the shunt position α sequentially moves from that based on the input port 112 and reaches that based on the input port 113. Conventionally, since the light spot of input light or output light has an elliptical shape, the region of the output light that enters the output port 111 may interfere with the light spot at the shunt position α, resulting in crosstalk. In this embodiment, however, since the light-shielding portion 10 is provided, the light spot of the output light output toward the shunt position α is shielded by the projecting portion 12 and does not travel toward the output port 111. This enables to prevent crosstalk.

When the light spot of the output light projected to the shunt position α has changed to that based on the input port 113, the mirror of each MEMS mirror device 151 pivots about the y-axis to couple the light spot with the output port 111, as indicated by b. The switching operation thus ends.

As described above, according to this embodiment, the light-shielding portion 10 is provided. Hence, when outputting predetermined output light from a predetermined output port, output light other than the predetermined output light can be prevented from being output from the predetermined output port. As a result, crosstalk can be reduced upon switching the input/output port.

In addition, adjusting the position of the end portion of the projecting portion 12 enables to adjust the attenuation amount of the output light. Hence, output light having a desired light intensity can be output.

Note that the shape of the light-shielding portion 10 is not limited to that shown in FIG. 2, and can freely be set as needed in accordance with the arrangement of the optical system and the like.

Figure 3:
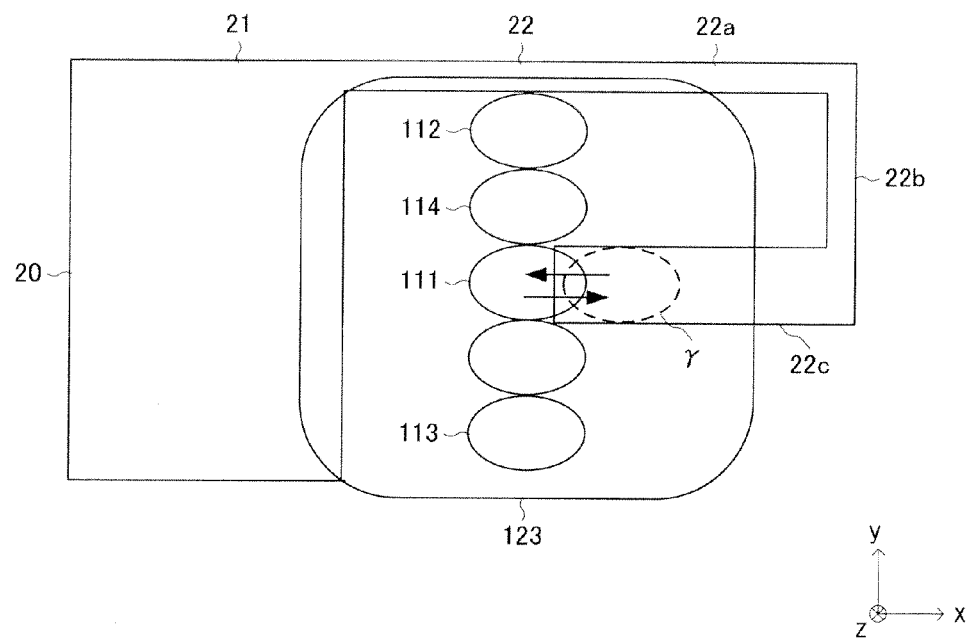
FIG. 3 is a front view schematically showing a modification of the light-shielding portion.

For example, the light-shielding portion may have an arrangement as shown in FIG. 3. A light-shielding portion 20 shown in FIG. 3 is formed from a member that passes no light, and includes a base portion 21 having an almost rectangular shape when viewed from the upper side, and an arm portion 22 extending from the upper portion of one side of the base portion 11 along the y-axis direction and having an almost "U" shape when viewed from the upper side. The arm portion 22 includes a first member 22a having an almost rectangular shape when viewed from the upper side and extending from an end connected to the upper portion of the base portion 21 to the positive side in the x-axis direction, a second member 22b having an almost rectangular shape when viewed from the upper side and linearly extending from the other end of the first member 22a to the negative side in the y-axis direction, and a third member 22c having an almost rectangular shape when viewed from the upper side and linearly extending from the other end of the second member 22b to the negative side in the x-axis direction.

The light-shielding portion 20 shown in FIG. 3 is applied to an optical switch in which a shunt position γ corresponding to the shunt position α shown in FIG. 2 is provided on the opposite side of the region corresponding to the output port 111. In this case, as for the arm portion 22, the base portion 21 is disposed adjacent to the second lens 123 on the negative side of the x-axis such that the other end of the third member 12c projects toward the center of the second lens 123 when the second lens 123 is viewed from the negative side of the z-axis, as shown in FIG. 3. The third member 22c thus overlaps the shunt region γ. The other end of the third member 22c interferes with part of the region of output light entering the output port 111 on the positive side in the x-axis direction. Hence, providing the light-shielding portion 20 enables to prevent crosstalk and adjust the attenuation amount.

Figure 4:
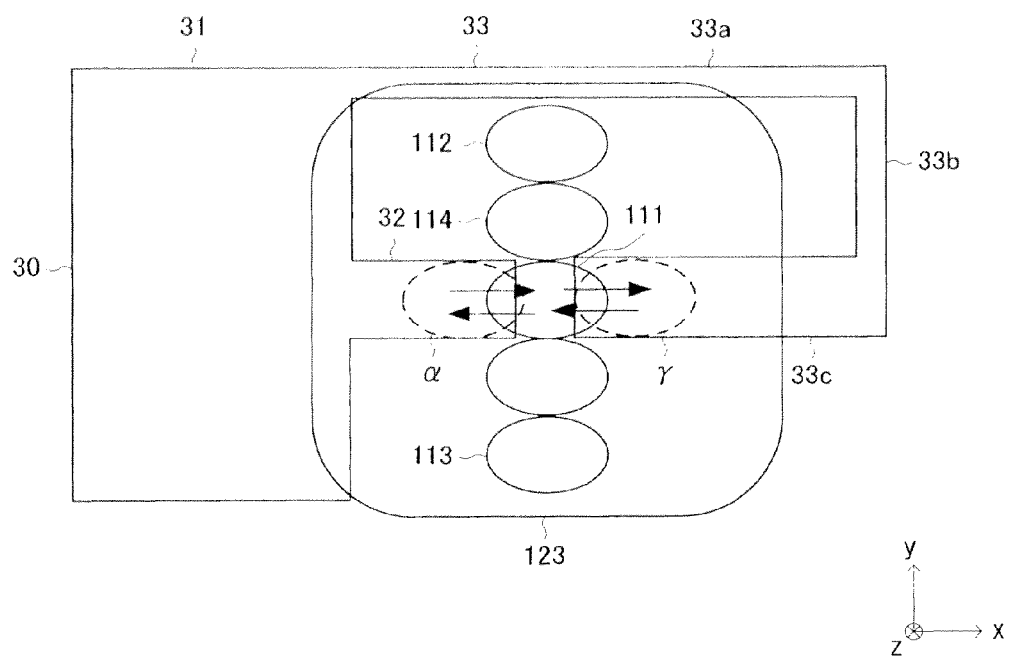
FIG. 4 is a front view schematically showing a modification of the light-shielding portion.

The light-shielding portion may have an arrangement as shown in FIG. 4. A light-shielding portion 30 shown in FIG. 4 is formed by combining the above-described light-shielding portions 10 and 20. That is, the light-shielding portion 30 is formed from a member that passes no light, and includes a base portion 31 having an almost rectangular shape when viewed from the upper side, a projecting portion 32 projecting from the center of one side of the base portion 31 along the y-axis direction toward the positive side in the x-axis direction, and an arm portion 33 extending from the upper portion of the one side of the base portion 31 and having an almost "U" shape when viewed from the upper side.

The projecting portion 32 is formed into an almost rectangular shape when viewed from the upper side so that the length in the y-axis direction is equal to or larger than the length of output light in the y-axis direction, and the length in the x-axis direction is equal to or larger than the length of output light in the x-axis direction.

The arm portion 33 includes a first member 33a having an almost rectangular shape when viewed from the upper side and extending from an end connected to the upper portion of the base portion 31 to the positive side in the x-axis direction, a second member 33b having an almost rectangular shape when viewed from the upper side and linearly extending from the other end of the first member 33a to the negative side in the y-axis direction, and a third member 33c having an almost rectangular shape when viewed from the upper side and linearly extending from the other end of the second member 33b to the negative side in the x-axis direction.

The light-shielding portion 30 shown in FIG. 4 is applied to an optical switch having the shunt position α shown in FIG. 2 and the shunt position γ shown in FIG. 3. As for the light-shielding portion 30, the base portion 31 is disposed adjacent to the second lens 123 on the negative side of the x-axis such that the projecting portion 32 projects toward the center of the second lens 123, and the other end of the third member 33c projects toward the center of the second lens 123 when the second lens 123 is viewed from the negative side of the z-axis, as shown in FIG. 4. The projecting portion 32 thus overlaps the shunt position α. The end portion of the projecting portion 32 interferes with part of the region of output light entering the output port 111 on the negative side in the x-axis direction. In addition, the third member 33c overlaps the shunt region γ. The other end of the third member 33c interferes with part of the region of output light entering the output port 111 on the positive side in the x-axis direction. Hence, providing the light-shielding portion 30 enables to prevent crosstalk and adjust the attenuation amount.

Second Embodiment

The second embodiment of the present invention will be described next. Note that in an optical switch according to this embodiment, the same names and reference numerals are added to the same constituent elements as those of the optical switch 100 described with reference to FIGS. 9 to 11 and those in the above-described first embodiment, and a description thereof will appropriately be omitted.

Figure 5:
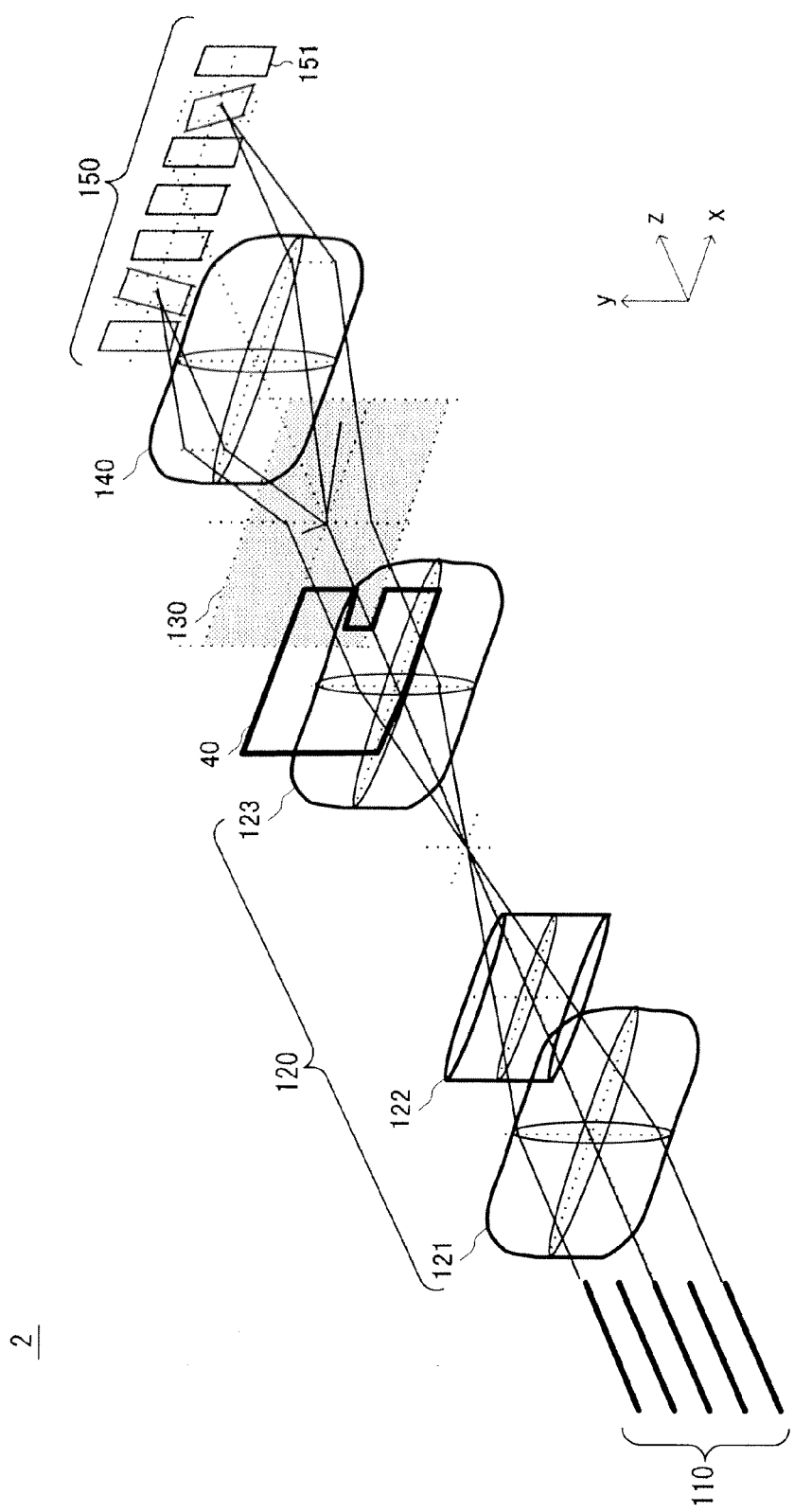
FIG. 5 is a perspective view schematically showing the arrangement of an optical switch according to the second embodiment of the present invention.

As shown in FIG. 5, an optical switch 2 according to this embodiment is a DROP-type wavelength-selective optical switch, and includes an input/output port array 110 having input and output ports arrayed in a predetermined direction, a condenser optical system 120 formed from a first lens 121, a cylindrical lens 122, and a second lens 123, a light-shielding portion 40, a diffraction grating 130, a third lens 140, and a mirror array 150 having a plurality of MEMS mirror devices 151 arrayed in a line along a predetermined direction. These components are arrayed in a line along the z-axis in the order named. The mirror of each MEMS mirror device 151 can pivot about the x-axis perpendicular to the z-axis and about the y-axis perpendicular to the x-axis. The input/output ports are arrayed in the direction along the y-axis. The MEMS mirror devices 151 are arrayed in the direction along the x-axis.

Figure 6:
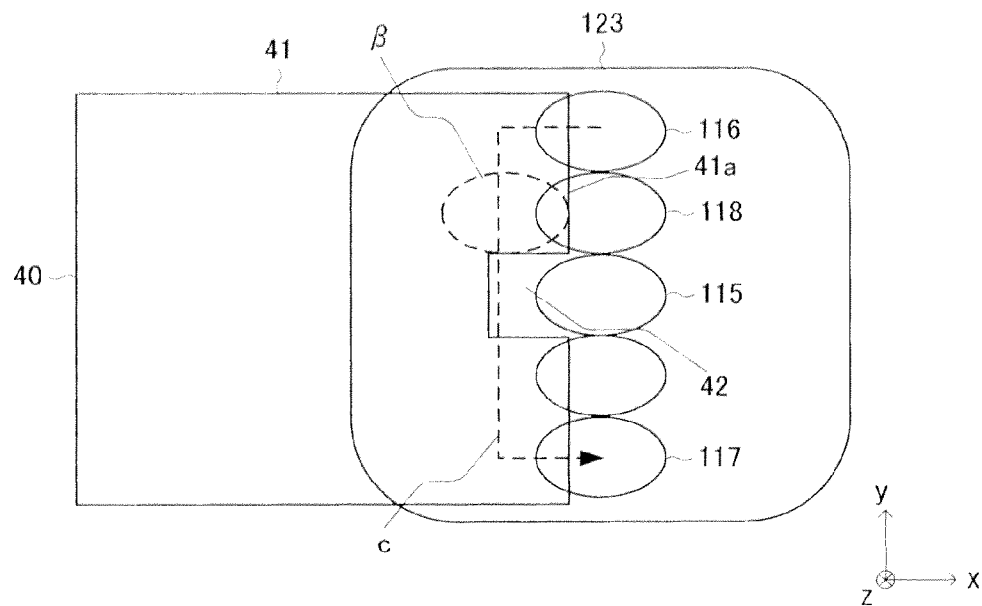
FIG. 6 is a front view schematically showing the arrangement of a light-shielding portion.

The light-shielding portion 40 is formed from a light-shielding mask such as a plate member that passes no light. The light-shielding portion 40 includes a base portion 41 having an almost rectangular shape when viewed from the upper side, and a concave portion 42 concaved from the center of one side of the base portion 41 along the y-axis direction toward the negative side in the x-axis direction. The concave portion 42 is formed into an almost rectangular shape when viewed from the upper side so that the length in the y-axis direction is equal to or larger than the length of output light in the y-axis direction. As for the light-shielding portion 40, the base portion 41 is disposed adjacent to the second lens 123 on the negative side of the x-axis such that the concave portion 42 surrounds the center of the second lens 123, and an end portion (to be referred to as a light-shielding end portion hereinafter) 41a of the base portion 41 on the positive side in the x-axis direction interferes with part of the end portion of output light entering an output port on the negative side in the x-axis direction when the second lens 123 is viewed from the negative side of the z-axis, as shown in FIG. 6. In addition, the light-shielding portion 40 is disposed at a position between the second lens 123 and the diffraction grating 130, where each light spot is not demultiplexed and spreads to an appropriate size. This allows to effectively shield a desired light spot.

The operation of the optical switch 2 according to this embodiment will be described next. Note that in this embodiment, an example will be explained in which one input port and four output ports are provided. The positive y-direction is defined as upward, and the negative y-direction as downward. An output port 116 is disposed at the uppermost portion, and an output port 117 is disposed at the lowermost portion. At output port 118 is disposed immediately below the output port 116. An input port 115 is disposed at the center.

Input light input from the input port 115 travels toward the diffraction grating 130 via the condenser optical system 120. As shown in FIG. 6, the concave portion 42 of the light-shielding portion 40 is provided to surround the region where the input light passes, and does not interfere with the input light. Hence, the input light reaches the diffraction grating 130 without being shielded by the light-shielding portion 40.

The input light that has reached the diffraction grating 130 is demultiplexed by it for each wavelength. Each of the demultiplexed input light components of the respective wavelengths is condensed by the third lens 140 and enters a corresponding one of the MEMS mirror devices 151 of the mirror array 150. Output light components of the respective wavelengths deflected by the MEMS mirror devices 151 are condensed by the third lens 140 and pass through the diffraction grating 130. The output light that has passed through the diffraction grating 130 travels toward the condenser optical system 120. At this time, the light-shielding end portion 41*a* interferes with part of the end portion of the output light entering the output port on the negative side in the x-axis direction, as shown in FIG. 6. The light intensity of the output light is thus attenuated in accordance with the amount of interference with the light-shielding portion 40.

The output light whose light intensity is adjusted by the light-shielding portion 40 is output from a corresponding output port via the condenser optical system 120.

The operation of the optical switch 2 according to this embodiment when switching the port to output the output light will be described next with reference to FIG. 6. Note that an example will be explained below in which the output port to output the output light is switched from the output port 116 to the output port 117.

First, the mirror of the MEMS mirror device 151 corresponding to a predetermined wavelength pivots sequentially about the y-axis, the x-axis, and the y-axis. Then, a light spot β of the output light with the predetermined wavelength moves from the output port 116 to the output port 117, as indicated by c. Conventionally, since the light spot of output light has an elliptical shape, the region of the output light that enters each output port adjacent to the moving path may interfere with the light spot β of the output light, resulting in crosstalk. In this embodiment, however, since the light-shielding portion 40 is provided, the light spot β of the output light is shielded by the light-shielding end portion 41*a* and dos not travel to the output port side. This enables to prevent crosstalk.

As described above, according to this embodiment, the light-shielding portion 40 is provided. Hence, when outputting predetermined output light from a predetermined output port, output light other than the predetermined output light can be prevented from being output from the predetermined output port. As a result, crosstalk can be reduced upon switching the input/output port.

Note that the shape of the light-shielding portion 40 is not limited to that shown in FIG. 6, and can freely be set as needed in accordance with the arrangement of the optical system and the like.

Figure 7:
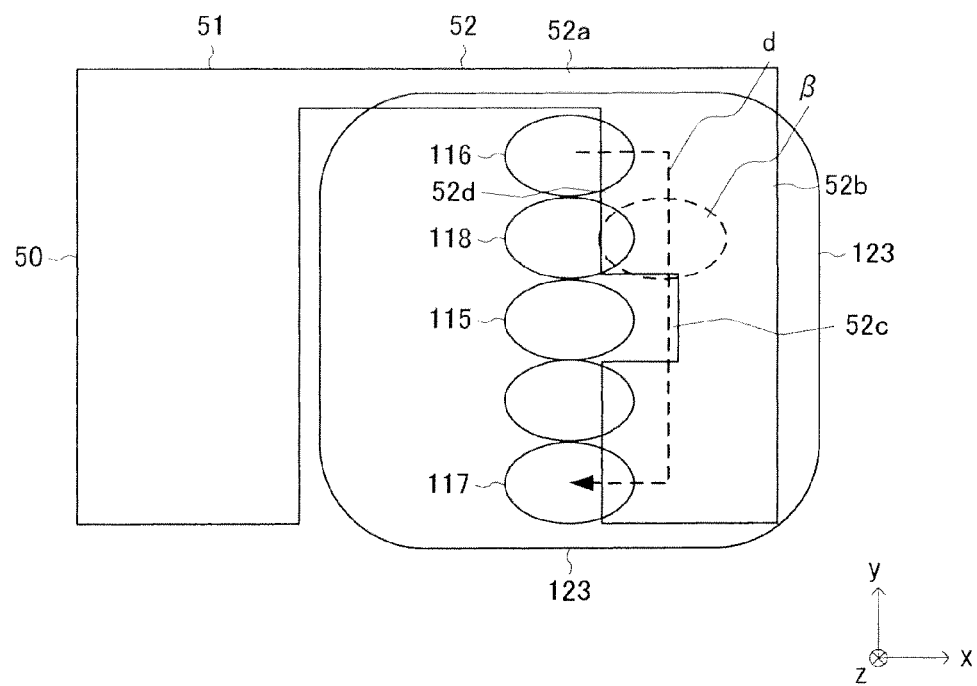
FIG. 7 is a front view schematically showing a modification of the light-shielding portion.

For example, the light-shielding portion may have an arrangement as shown in FIG. 7. A light-shielding portion 50 shown in FIG. 7 is formed from a member that passes no light, and includes a base portion 51 having an almost rectangular shape when viewed from the upper side, and an arm portion 52 extending from the upper portion of one side of the base portion 51 along the y-axis and having an almost "L" shape when viewed from the upper side. The arm portion 52 includes a first member 52*a* having an almost rectangular shape when viewed from the upper side and extending from an end connected to the upper portion of the base portion 51 to the positive side in the x-axis direction, a second member 52*b* having an almost rectangular shape when viewed from the upper side and linearly extending from the other end of the first member 52*a* to the negative side in the y axis direction, and a concave portion 52*c* formed almost at the center of a side of the second member 52*b* opposing the base portion 51. The concave portion 52*c* is formed into an almost rectangular shape when viewed from the upper side so that the length in the y-axis direction is equal to or larger than the length of output light in the y-axis direction.

The light-shielding portion 50 shown in FIG. 7 is applied to an optical switch in which a moving locus c shown in FIG. 6 is set on the opposite side of the region corresponding to the input/output port. In this case, the arm portion 52 is disposed such that the concave portion 52*c* surrounds the center of the second lens 123, and an end portion (light-shielding end portion) 52*d* of the second member 52*b* opposing the base portion 51 interferes with part of the end portion of output light entering the output port on the positive side in the x-axis direction when the second lens 123 is viewed from the negative side of the z-axis, as shown in FIG. 7. Upon switching the output port of the output light along a moving locus d, the light spot β of the output light is shielded by the light-shielding end portion 52*d* and does not travel to the output port side.

This enables to prevent crosstalk. In addition, the light intensity is attenuated in accordance with the amount of interference between the output light and the light-shielding portion 50. Adjusting the position of the light-shielding end portion 52*d* and thus controlling the amount of the output light to be shielded by the light-shielding end portion 52*d* allows to control the attenuation amount of the light intensity of the output light.

Figure 8:
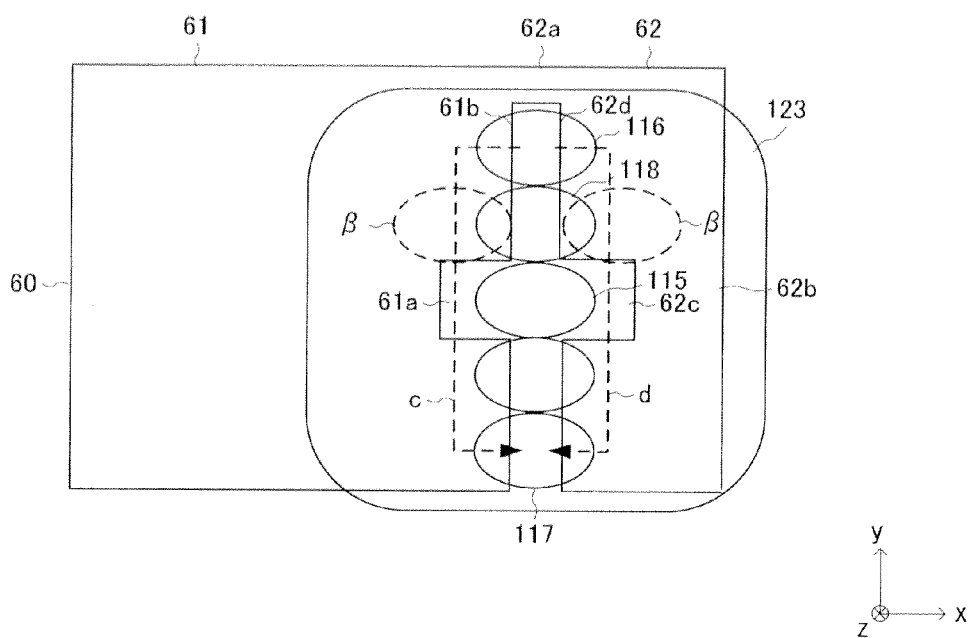
FIG. 8 is a front view schematically showing a modification of the light-shielding portion.

The light-shielding portion may have an arrangement as shown in FIG. 8. A light-shielding portion 60 shown in FIG. 8 is formed by combining the above-described light-shielding portions 40 and 50. That is, the light-shielding portion 60 is formed from a member that passes no light, and includes a base portion 61 having an almost rectangular shape when viewed from the upper side, and an arm portion 62 extending from the upper portion of one side of the base portion 61 along the y-axis and having an almost "L" shape when viewed from the upper side.

The base portion 61 includes a concave portion 61*a* concaved from the center of one side along the y-axis on the positive side of the x-axis toward the negative side in the x-axis direction. The arm portion 62 includes a first member 62*a* having an almost rectangular shape when viewed from the upper side and extending from an end connected to the upper portion of the base portion 61 to the positive side in the x-axis direction, a second member 62*b* having an almost rectangular shape when viewed from the upper side and linearly extending from the other end of the first member 62*a* to the negative side in the y-axis direction, and a concave portion 62*c* formed almost at the center of a side of the second member 62*b* opposing the base portion 61. The concave portions 61*a* and 62*c* are formed into an almost rectangular shape when viewed from the upper side so that the length in the y-axis direction is equal to or larger than the length of output light in the y-axis direction.

The light-shielding portion 60 shown in FIG. 8 is applied to an optical switch in which the light spot β of the output light moves along the moving path c shown in FIG. 6 and the moving path d shown in FIG. 7 when switching the output port. In this case, the light-shielding portion 60 is disposed such that the concave portions 61*a* and 62*c* surround the center of the second lens 123, an end portion (light-shielding end portion) 61*b* of the base portion 61 on the positive side in the x-axis direction interferes with part of an end portion of the output light entering the output port on the negative side in the x-axis direction, and an end portion (light-shielding end portion) 62*d* of the second member 62*b* opposing the base portion 61 interferes with part of an end portion of the output light on the positive side in the x-axis direction when the second lens 123 is viewed from the negative side of the z-axis, as shown in FIG. 8. Upon switching the output port of the output light along the moving loci c and d, the light spot β of the output light is shielded by the light-shielding end portions 61*b* and 62*d* and does not travel to the output port side. This enables to prevent crosstalk. In addition, the light intensity is attenuated in accordance with the amount of interference between the output light and the light-shielding portion 60. Adjusting the position of the light-shielding end portions 61*b* and 62*d* and thus controlling the amount of the output light to be shielded by the light-shielding end portions 61*b* and 62*d* allows to control the attenuation amount of the light intensity of the output light.

INDUSTRIAL APPLICABILITY

The present invention is applicable to various kinds of apparatuses for deflecting the path of light.

EXPLANATION OF THE REFERENCE NUMERALS AND SIGNS 1, 2 . . . optical switch, 10 . . . light-shielding portion, 11, 21 . . . base portion, 12 . . . projecting portion, 20 . . . light-shielding portion, 22 . . . arm portion, 22*a* . . . first member, 22*b* . . . second member, 22*c* . . . third member, 30 . . . light-shielding portion, 31 . . . base portion, 32 . . . projecting portion, 33 . . . arm portion, 33*a* . . . first member, 33*b* . . . second member, 33*c* . . . third member, 40 . . . light-shielding portion, 41 . . . base portion, 41*a* . . . light-shielding end portion, 42 . . . concave portion, 50 . . . light-shielding portion, 51 . . . base portion, 52 . . . arm portion, 52*a* . . . first member, 52*b* . . . second member, 52*c* . . . concave portion 52*d* . . . light-shielding end portion, 60 . . . light-shielding portion, 61 . . . base portion, 61*a* . . . concave portion, 61*b* . . . light-shielding end portion, 62 . . . arm portion, 62*a* . . . first member, 62*b* . . . second member, 62*c* . . . concave portion, 62*d* . . . light-shielding end portion, 110 . . . input/output port array, 120 . . . condenser optical system, 121 . . . first lens, 122 . . . cylindrical lens, 123 . . . second lens, 130 . . . diffraction grating, 140 . . . third lens, 150 . . . mirror array, 151 . . . MEMS mirror device

The invention claimed is:

1. An optical switch comprising:
an input/output unit in which at least one input port and at least one output port are arrayed along a first direction;
a demultiplexing unit that demultiplexes input light input from the input port for each wavelength;
a deflecting unit that deflects the input light demultiplexed by said demultiplexing unit and outputs the light from a predetermined output port as output light;
a light-shielding portion that, when outputting predetermined output light from the predetermined output port, shields output light other than the predetermined output light so as to prevent the output light from being output from the predetermined output port,
a condenser optical system that is disposed between said input/output unit and said demultiplexing unit and includes a first lens, a cylindrical lens, and a second lens; and
a third lens disposed between said demultiplexing unit and said deflecting unit,
wherein said input/output unit, said first lens, said cylindrical lens, said second lens, said light-shielding portion, said demultiplexing unit, said third lens, and said deflecting unit are disposed sequentially in this order.

2. An optical switch according to claim 1, wherein said light-shielding portion shields part of the output light.

3. An optical switch according to claim 1, wherein
said input/output unit comprises a plurality of input ports and one output port, and
said light-shielding portion shields the output light so as to prevent the output light other than output light based on the input light from the predetermined input port from being output from the output port.

4. An optical switch according to claim 3, wherein said light-shielding portion is a light-shielding mask that includes a base portion having a substantially rectangular shape when viewed from an upper side, and a projecting portion projecting from a center of one side of said base portion.

5. An optical switch according to claim 1, wherein
said input/output unit comprises one input port and a plurality of output ports, and
said light-shielding portion shields output light having a predetermined wavelength so as to prevent the output light from being output from an output port other than the predetermined output port.

6. An optical switch according to claim 5, wherein said light-shielding portion is alight-shielding mask that includes a base portion having a substantially rectangular shape when viewed from an upper side, and a concave portion concaved from a center of one side of said base portion.

* * * * *

UNITED STATES PATENT AND TRADEMARK OFFICE
CERTIFICATE OF CORRECTION

| | |
|---|---|
| PATENT NO. | : 8,699,832 B2 |
| APPLICATION NO. | : 13/260554 |
| DATED | : April 15, 2014 |
| INVENTOR(S) | : Nobuaki Matsuura et al. |

It is certified that error appears in the above-identified patent and that said Letters Patent is hereby corrected as shown below:

In the Claims,

Column 12, Claim 6, line 40, delete "alight" and insert --a light--.

Signed and Sealed this
Twenty-third Day of December, 2014

Michelle K. Lee
*Deputy Director of the United States Patent and Trademark Office*